United States Patent [19]

Saito

[11] 3,787,744
[45] Jan. 22, 1974

[54] LAMINATED IRON CORE OF ROTARY ELECTRIC MACHINES
[75] Inventor: Kiyoshi Saito, Hitachi, Japan
[73] Assignee: Hitachi, Ltd., Tokyo, Japan
[22] Filed: July 11, 1972
[21] Appl. No.: 270,871

[52] U.S. Cl. .............................. 310/217, 310/258
[51] Int. Cl. ............................................. H02k 1/06
[58] Field of Search .................... 310/216–218, 258, 310/259

[56] References Cited
UNITED STATES PATENTS

| | | | |
|---|---|---|---|
| 3,652,889 | 3/1972 | Reece et al. | 310/217 X |
| 3,488,754 | 1/1970 | Hohnstein | 310/216 |
| 3,307,059 | 2/1967 | Kitano et al. | 310/216 |
| 1,779,950 | 10/1930 | Reichel | 310/258 |
| 2,774,000 | 12/1956 | Ross | 310/216 |
| 3,221,195 | 11/1965 | Hoffman | 310/217 X |

Primary Examiner—J. D. Miller
Assistant Examiner—Mark O. Budd
Attorney, Agent, or Firm—Paul M. Craig, Jr. et al.

[57] ABSTRACT

A newly developed laminated iron core is composed of number of unit segments, each of which is shaped such that one radial marginal periphery defines a half of a coil slot and the opposite periphery defines a half of a tooth between the two coil slots.

Accordingly, when such segments are juxtaposed to form a layer of an annular iron core, a pair of the segments constitute a sector having an odd number $(2n + 1)$ of coil slots, wherein $n$ is the number of coil slots in a unit segment, whereas a pair of unit segments of ordinary type bears an even number of coil slots.

Assembled iron cores each using either one of the type mentioned above bear a different number of coil slots suitable for different frequencies such as 50 Hertz and 60 Hertz but has the same outside and inside diameter and the same number of dovetail notches, thereby permitting two kinds of iron cores to be supported within a stator frame of single unified type.

7 Claims, 4 Drawing Figures

LAMINATED IRON CORE OF ROTARY ELECTRIC MACHINES

This invention relates to improvements in laminated iron cores used in rotary electric machines, such as large capacity turbine generators or water-wheel generators, and more particularly to improvements in such laminated iron cores in which unit segments constituting the iron core are juxtaposed side by side and are stacked one after another in such a manner that the segments juxtaposed in a flat plane form a unit layer of an iron core and the stacked segments constitute multiple unit layers laminated in a staggered relation to each other so that one layer has a lead having a pitch of one coil slot with respect to the next layer and so on, progressively.

In general, a stator core used in large capacity rotary electric machine is composed of a plurality of iron plates laminated one after another each consisting of a silicon steel having a thickness of about 0.35 mm, one or both surfaces thereof is applied with insulating treatment in order to prevent a loss caused by eddy current during the rotation of the core.

By reason of increasing the available percentage of the blank sheet material and magnetic orientation, it becomes necessary to make these iron plates from the blank sheet material in such a manner that the magnetic resistance of the product core will become smallest, and to this end it is a common practice to divide each iron plate circumferentially into a plurality of segments, i.e., sectoral segments.

In this case, if the segments of the iron plate are different in size from each other, a corresponding number of different dies will be required for punching these segments out of the blank sheet material, which is very uneconomical. Therefore, it is usual to divide the iron plate equally in the circumferential direction into a plurality of segments.

The iron plates, i.e., segment iron plates, each being divided as above described, are juxtaposed side by side and stacked one on another so as to be laminated in staggered relation to each other to form an annular iron core, but the iron core of such a construction has a number of problems yet to be solved.

For instance, the manner of staggering the segment iron plates relative to each other, the method of supporting the thus laminated iron core on the stator frame, the relation between the supporting members and each of the iron plates, and the relation between the number of divisions of the iron plate and the numbers of the supporting grooves and coil slots, are such problems.

The present invention is intended to solve these problems.

In the production, for example, of a generator which has a predetermined capacity at a predetermined output voltage, it would be certainly ideal if a generator of the same capacity at the same voltage can be obtained only by changing the rotational speed, even if there is a frequency difference between 50 Hertz and 60 Hertz. In general, however, the output voltage necessarily varies when the rotational speed changes, and hence it is a usual practice to change the number of turns of the coil according to the frequency.

Changing the number of turns of the coil, therefore, causes the number of the coil slots of the iron core to be changed and accordingly causes the stator frame to be changed as will be described in detail later.

In the past, it has been usual that the number of coil slots of a stator core used in large-sized, high speed, rotary electric machines is changed from 30 to 36, 42, 48, 54, 60, 66, 72, 78 by the number of 6, and on the other hand, the number of segments is an integer into which all the slots are completely divided, as the segment iron plate is divided euqally as has been stated previously.

In view of the foregoing, the relation between the number of segments and the number of key bars supporting the iron core, for each number of slots in the conventional stator cores is summarized as follows:

| Total number of slots | Number of segments | Number of key bars |
| --- | --- | --- |
| 30 | 10, 15 | 10, 15 |
| 36 | 12, 18 | 12, 18 |
| 42 | 14, 21 | 14, 21 |
| 48 | 12, 16, 24 | 12, 16, 24 |
| 54 | 18 | 18 |
| 60 | 15, 20 | 15, 20 |
| 66 | 22 | 22 |
| 72 | 18, 24 | 18, 24 |
| 78 | 26 | 26 |

From the above table, it will be apparent that a change in the total number of slots results in a change in the number of segments and the number of key bars, namely, the stator frame is to be changed, since the key bars are kept integral with the stator frame.

More practically, in case, for example, of machines, such as a standard gas turbine generator, the stator of which is produced by mass production with the same diameter, only a change in the total number of slots, caused by a partial change in the requirement, e.g., a difference of frequency between 50 Hertz and 60 Hertz, or a difference of terminal voltage, causes the stator frame to be further changed due to the difference of the number of key bars, even though the outer diameter and thickness of the iron core remain the same.

This means that in the mass production, for example, of rotary electric machines for use with 50 Hertz and 60 Hertz, a stator frame for 36 slots and 12 key bars, and a stator frame for 42 slots and 14 key bars must be provided separately to each other, which is undesirable from the standpoint of mass production and has adversely affected shortening of the delivery term and reduction of the production costs of the rotary electric machines.

As may be apparent from the foregoing description, again with reference to the above-described case, it would be very advantageous from the standpoint of mass production if the two types of cores having 36 slots and 42 slots could be supported by a unified type stator frame for 12 segments and 12 key bars because only one stator frame will suffice the need.

In this view, the object of the present invention is to provide a laminated iron core of the type described, which enables the same stator frame to be used without the necessity for changing the number of key bars, even when the number of coil slots slightly changes, and which, therefore, is desirable from the standpoint of mass production of rotary electric machines comprising such an iron core.

In order to attain the object set forth above, according to the present invention there is provided a laminated iron core of rotary electric machines, in which each segment iron plate constituting the laminated iron core is prepared as a sector and each of said segments is so shaped that one radial circumferential side thereof defines the half of the coil slot, while the other circumferential side thereof defines the half of the tooth formed between the adjacent coil slots.

According to another aspect of the invention there is provided a laminated iron core of the character described above, in which each segment iron plate is formed along the outer peripheral edge thereof with supporting notches, the number of which is a multiple of the number of the coil slots provided along the inner peripheral edge.

As a result, a plurality of segments constitute an annular disc of single layer, when they are juxtaposed side by side in a plane, also a pair of the juxtaposed segments constitute a sector having an odd number of coil slots represented by $2n + 1$, wherein $n$ is the number of coil slots in a single segment.

Also the segments are stacked one piece on another to form a great number of layers to constitute a laminated iron core, further in stacking, each segment is positioned in a staggered relation to keep a lead of a pitch of one coil slot with respect to the one immediately below.

All of the segments thus assembled have both coil slots and key bar notches each kept in alignment throughout the whole laminated layers and may be secured by at least one key bar and at any one of its full key slots.

And further each segment is composed of a plurality of segments which are so shaped that only one punching die will suffice the punching of them from a blank sheet material.

Figure 1:
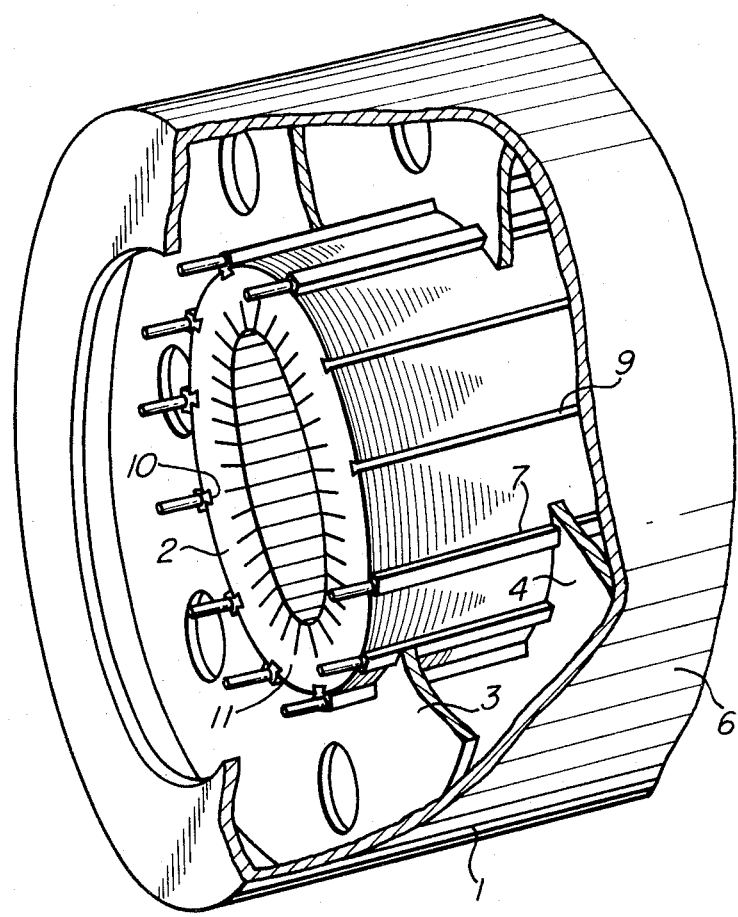
FIG. 1 is a perspective view, partially broken away, of a stator comprising the laminated iron core of the present invention.

The present invention will be described in detail hereunder with reference to the embodiment shown in the drawings.

Referring first to FIG. 1 there is shown in partially broken away perspective view the essential portion of a stator for use in turbine generators, which comprises a stator frame 1 and a stator core 2.

The stator frame 1 is composed of hollow, substantially circular main plates 3, 4 and a cylindrical plate 6 secured to said main plates 3, 4. Axially extending key bars 7 are fixed to the inner peripheral edges of the main plates 3, 4 in the circumferential direction of said main plates at a predetermined interval between each other.

These key bars 7 serve to hold the stator core 2 disposed within the stator frame 1 and each has a dovetail key 10 along the inner surface thereof.

The dovetail 10 may be formed integrally with the key bar 7 by cutting or may be fabricated separately from the key bar 7 and secured to said key bar by welding or with bolts or like means.

The stator core 2 supported by these key bars 7, in the assembled state of the stator, is annular in shape and is composed of a plurality of annular discs each consisting of segments juxtaposed side by side.

Figure 2:
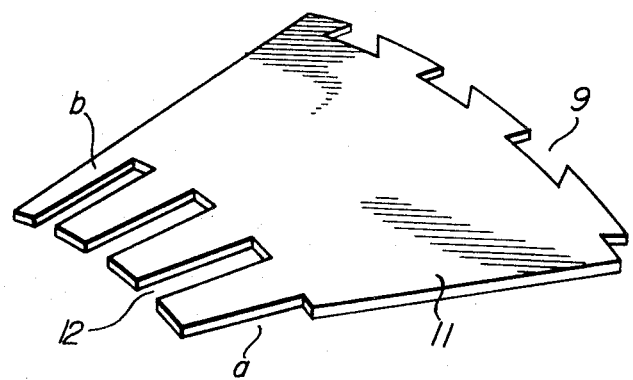
FIG. 2 is a perspective view of the unit segment constituting the segment iron plate of the laminated iron core shown in FIG. 1.

Each annular iron disc is composed of a plurality of unit segments 11 each being of the shape as shown in FIG. 2.

As shown in FIG. 2, each segment 11 has dovetail notches 9 formed in the outer peripheral edge thereof as stated previously for receiving the key bar 7 of the stator frame 1 and has coil slots 12 formed in the inner peripheral edge thereof for receiving a coil.

As shown, the segment 11 has a sectoral shape and is formed with the coil slots 12 and dovetail notches 9, and in more detail, is shaped as will be described below:

Namely, as shown in FIG. 2, the segment is so shaped that the center of the coil slot 12 is located at one circumferential end $a$ thereof or, in other words, said circumferential end $a$ will define the half of the coil slot, and the center of the tooth is located at the other circumferential end $b$ thereof.

Figure 3:
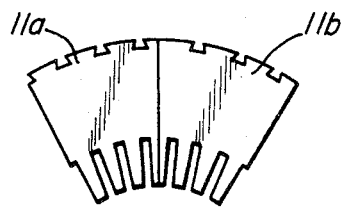
FIGS. 3 and 4 are plan views respectively illustrating the different manners of putting the unit segments together.
Figure 4:
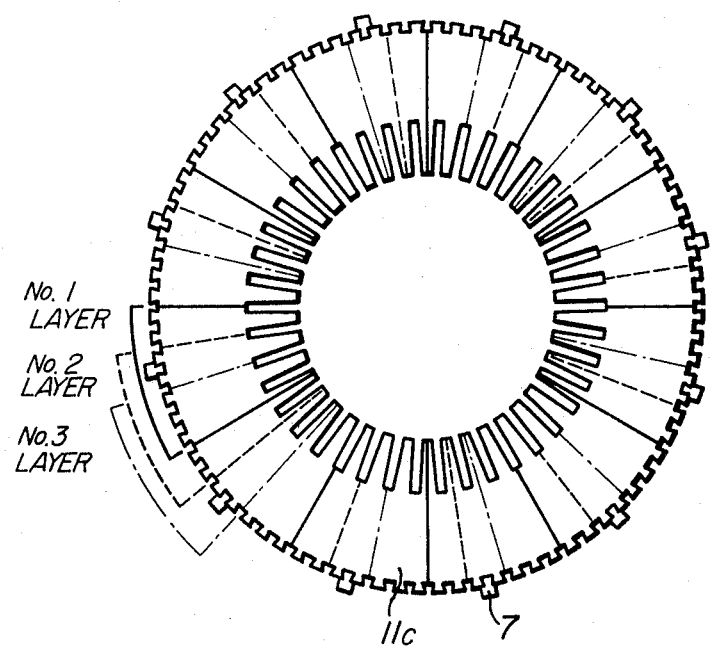

In an embodiment as shown in FIG. 3, two different types 11a and 11b of such segments 11 are provided, which are different from each other in respect of the positions of the dovetail notches as shown in FIG. 3 and these two segments 11a, 11b are arranged side by side, with the halves of coil slots at one of the ends thereof joined together and the halves of teeth at the other ends thereof joined together, to form one segment plate. The segments are also stacked one on another with the joints of one unit segment being staggered from the other immediately below in a similar manner, as shown in FIG. 4 (No. 1, No. 2 and No. 3 in FIG. 4 indicate the staggered state) of another embodiment.

In this case, the respective segment plates are each supported by at least one key bar 7 at the full dovetail notch formed in the outer peripheral edge thereof as a matter of course and thus the entire core is supported in the stator frame 1.

Now, the reason why the stator core of the construction described above can be supported by stator frames having the same number of key bars even if the total number of coil slots are slightly different, will be described using practical numerical values. With reference, for example, to a stator with 36 slots, 12 segments and 12 key bars and a different stator with 42 slots, 12 segments and 12 key bars, which have conventionally selectively been used with a current frequency of 50 Hertz and of 60 Hertz, respectively, if each segment plate of the core of the former stator is composed of 12 segments each having three coil slots arranged symmetrically with those of the adjacent segment, the iron core will have a total of 36 slots as will be obvious from $3 \times 12 = 36$ and hence the stator core will have 36 coil slots, so that there will be no problem in mounting the stator core in a stator frame having 12 key bars.

In the latter stator, the segment plate of the stator core is composed of segments 11a and 11b of the type shown in FIG. 3 as described previously and each segment is provided with 3.5 notches, and such segments are juxtaposed side by side and stacked one on another in staggered relation in such a manner that the halves of the slot are joined together to form axially alligned coil slots as described previously.

Namely, the core will have a total of 42 coil slots as will be obvious from $3.5 \times 12$ (the number of segments) $= 42$ and can be mounted in the stator frame having 12 key bars.

As described, even the core of the type having, for example, 42 slots can be mounted in the stator frame having 12 key bars, if said core is constructed according to the present invention, and the same stator frame as intended for a core having 36 slots can be used for such a core.

Hereinbefore, it has been stated that two different types of segments 11a and 11b are prepared for the purposes of minimizing the number of the dovetail notches formed in the outer peripheral edge of the segment iron plate. However, only one type of segment will suffice the need when the number of the dovetail notches is selected as will be described below:

FIG. 4 indicates another embodiment of the invention, in which the number of the dovetail notches is selected such that it is always two-fold of the number of the coil slots and the segment iron plates each having such a number of dovetail notches are juxtaposed side by side and front side front and back side front alternately and also stacked one on another in staggered relation.

In this way, only one type of segment 11c will suffice the need and hence only one type of punching die is required for the fabrication of segment iron plates so that the cost of punching die is reduced and in addition, unified segments of one type can be easily prepared, without paying any particular attention to the number of segments of each type to be produced.

Although the foregoing description has been given by using specific numerical values, it will be understood that in general stator segment plates each having a total of $12n$ slots and $12(n + 0.5)$ slots (wherein n is an integer) can be assembled and received within a stator frame having 12 key bars.

According to the present invention, as described herein, laminated cores of the type described, which enable the same stator frame to be used, without changing the number of key bars even if the number of coil slots is slightly varied, and hence is desirable from the standpoint of mass production of stator cores for rotary electric machines.

I claim:

1. A laminated iron core for a rotary electric machine, comprising a plurality of unit segment plates disposed side by side to form annular layers laminated one on another axially with the joint of each segment plate in staggered relation to the joints of the other segment plates into a core of an annular shape, each of said segment plates being provided with supporting notches in the outer peripheral edge and coil slots in the inner peripheral edge thereof, one radial marginal side of each segment plate defining one-half of a coil slot and the opposite side thereof defining one-half of a tooth formed by the adjacent coil slots, whereby each segment plate may be supported by at least one key bar at a supporting notch.

2. A laminated iron core for a rotary electric machine as claimed in claim 1, wherein the number of said supporting notches provided in said annular core is a multiple of the number of the coil slots.

3. A laminated iron core for a rotary electric machine as claimed in claim 1, wherein said core having a total of $12(n + 0.5)$ coils is supported by a stator frame having 12 key bars.

4. A laminated iron core as claimed in claim 1, wherein a plurality of annular layers composed of said segment plates and having a total of 42 coil slots are supported by a stator frame having 12 key bars.

5. A laminated iron core for a rotary electric machine as claimed in claim 2, wherein alternate segment plates are disposed upside down so that said half coil slot and said half tooth of adjacent segment plates are reversed to combine with the half coil slot and half tooth of the adjoining segment plate.

6. A laminated iron core for a rotary electric machine as claimed in claim 5, wherein said core having a total of $12(n + 0.5)$ coils is supported by a stator frame having 12 key bars.

7. A laminated iron core as claimed in claim 5, wherein a plurality of annular layers composed of said segment plates and having a total of 42 coil slots are supported by a stator frame having 12 key bars.

* * * * *